United States Patent
Kuan et al.

(10) Patent No.: US 10,430,587 B2
(45) Date of Patent: Oct. 1, 2019

(54) SYSTEM AND METHOD FOR MAINTAINING SECURITY TAGS AND REFERENCE COUNTS FOR OBJECTS IN COMPUTER MEMORY

(71) Applicant: HRL Laboratories, LLC, Malibu, CA (US)

(72) Inventors: George Kuan, Westlake Village, CA (US); Aleksey Nogin, Fresno, CA (US)

(73) Assignee: HRL Laboratories, LLC, Malibu, CA (US)

( * ) Notice: Subject to any disclaimer, the term of this patent is extended or adjusted under 35 U.S.C. 154(b) by 239 days.

(21) Appl. No.: 15/338,295

(22) Filed: Oct. 28, 2016

(65) Prior Publication Data
US 2017/0300694 A1 Oct. 19, 2017

Related U.S. Application Data

(60) Provisional application No. 62/247,460, filed on Oct. 28, 2015.

(51) Int. Cl.
*G06F 21/56* (2013.01)
*G06F 16/23* (2019.01)
(Continued)

(52) U.S. Cl.
CPC .......... *G06F 21/566* (2013.01); *G06F 16/23* (2019.01); *G06F 21/54* (2013.01); *G06F 21/577* (2013.01); *G06F 2221/034* (2013.01)

(58) Field of Classification Search
CPC .............................. G06F 21/54; G06F 21/566
(Continued)

(56) References Cited

U.S. PATENT DOCUMENTS 7,958,558 B1 * 6/2011 Leake ................. G06F 12/1416
726/23
8,621,607 B2 * 12/2013 Pike ....................... G06F 21/52
709/203

(Continued)

FOREIGN PATENT DOCUMENTS

WO WO 2007-068567 6/2007
WO WO 2010-151322 12/2010

OTHER PUBLICATIONS

Notification Concerning Transmittal of International Preliminary Report on Patentability for PCT/US2016/059597; dated Oct. 20, 2017.

(Continued)

*Primary Examiner* — Haresh N Patel
(74) *Attorney, Agent, or Firm* — Tope-McKay & Associates (57) ABSTRACT

Described is a system and method for monitoring and enforcing information flow security in software systems. The system maintains security tags and reference counts for objects in computer memory. When an object or a portion of an object in the computer memory is being modified, the system arbitrarily performs operations of updating a security tag for the object being modified; updating reference counts for all objects that the portion of the object in the computer memory being modified pointed to immediately prior to modification; and updating reference counts for all objects that the portion of the object in the computer memory being modified points to immediately after the modification. Subsequently, the system examines the security tags and if the examination reveals a potential information flow security violation, a corrective action is performed.

9 Claims, 5 Drawing Sheets

(51) Int. Cl.
*G06F 21/54* (2013.01)
*G06F 21/57* (2013.01)

(58) Field of Classification Search
USPC .......................................................... 726/23
See application file for complete search history.

(56) References Cited

U.S. PATENT DOCUMENTS

| | | | | |
|---|---|---|---|---|
| 2003/0080181 | A1* | 5/2003 | Mizuguchi | G07B 17/00508 235/375 |
| 2003/0140071 | A1* | 7/2003 | Kawamoto | G06F 12/0269 726/26 |
| 2003/0187854 | A1* | 10/2003 | Fairweather | G06F 8/427 726/26 |
| 2006/0037026 | A1* | 2/2006 | Doherty | G06F 9/526 719/310 |
| 2008/0307174 | A1* | 12/2008 | Garst | G06F 12/0253 711/160 |
| 2009/0055656 | A1 | 2/2009 | Mersh | |
| 2011/0022566 | A1* | 1/2011 | Beaverson | G06F 17/30097 707/639 |
| 2011/0225376 | A1 | 9/2011 | Hasting et al. | |
| 2011/0277038 | A1* | 11/2011 | Sahita | G06F 21/6281 726/27 |
| 2012/0030242 | A1* | 2/2012 | Nakamura | G06F 21/6218 707/781 |
| 2012/0047115 | A1 | 2/2012 | Subramanya et al. | |
| 2013/0117845 | A1* | 5/2013 | Kerschbaumer | G06F 21/53 726/22 |
| 2014/0139737 | A1* | 5/2014 | Clarke | H04N 21/236 348/465 |
| 2015/0058997 | A1* | 2/2015 | Lee | G06F 9/45558 726/26 |
| 2016/0140820 | A1* | 5/2016 | Joseph | G06Q 10/0833 340/572.1 |

OTHER PUBLICATIONS

International Preliminary Report on Patentability for PCT/US2016/059597; dated Oct. 20, 2017.
International Search Report of the International Searching Authority for PCT/US2016/059597; dated Feb. 2, 2017.
The Written Opinion of the International Searching Authority for PCT/US2016/059597; dated Feb. 2, 2017.
Notification of Transmittal of International Search Report and the Written Opinion of the International Searching Authority for PCT/US2016/059597; dated Feb. 2, 2017.
David F. Bacon, Perry Cheng, and V. T. Rajan. A Unified Theory of Garbage Collection. In Proceedings of the 19th Annual ACM SIGPLAN Conference on Object-oriented Programming, Systems, Languages, and Applications, OOPSLA '04, pp. 50-68, New York, NY, USA, 2004.
Arnar Birgisson, Vinod Ganapathy, and et al. Enforcing Authorization Policies using Transactional Memory Introspection. 2008, pp. 1-12.
Ariel Cohen, et al., editors, Formal Aspects in Security and Trust, vol. 5491, pp. 316-330. Springer Berlin-Heidelberg, Berlin, Heidelberg, 2009.
Winnie Cheng, Qin Zhao, Bei Yu, and Scott Hiroshige. TaintTrace: Efficient Flow Tracing with Dynamic Binary Rewriting. In Proceedings of the 11th IEEE Symposium on Computers and Communications, ISCC '06, pp. 749-754, Washington, DC, USA, 2006. IEEE Computer Society.
Andrey Ermolinskiy. Design and Implementation of a Hypervisor-based Platform for Dynamic Information Flow Tracking in a Distributed Environment. PhD thesis, University of California at Berkeley, Berkeley, CA, USA, 2011. AAI3473888, pp. 1-140.
Vasileios P. Kemerlis, Georgios Portokalidis, Kangkook Jee, and Angelos D. Keromytis. Libdft: Practical Dynamic Data Flow Tracking for Commodity Systems. In Proceedings of the 8th ACM SIGPLAN/SIGOPS Conference on Virtual Execution Environments, VEE '12, pp. 121-132, New York, NY, USA, 2012.
Shashidhar Mysore, Bita Mazloom, Banit Agrawal, and Timothy Sherwood. Understanding and Visualizing Full-Systems with Data Flow Tomography. In Proceedings of the 13th International Conference on Architectural Support for Programming Languages and Operating Systems, ASPLOS XIII, pp. 211-221, New York, NY, USA, 2008. ACM.
Andrew C. Myers. JFlow: Practical Mostly-static Information Flow Control. In Proceedings of the 26th ACM SIGPLAN-SIGACT Symposium on Principles of Programming Languages, POPL '99, pp. 228-241, New York, NY, USA, 1999. ACM.
Feng Qin, Cheng Wang, Zhenmin Li, Ho-seop Kim, Yuanyuan Zhou, and Youfeng Wu. LIFT: A Low-Overhead Practical Information Flow Tracking System for Detecting Security Attacks. In Proceedings of the 39th Annual IEEE/ACM International Symposium on Microarchitecture, MICRO 39, pp. 135-148, Washington, DC, USA, 2006. IEEE Computer Society.
N. Vachharajani, M.J. Bridges, J. Chang, R. Rangan, G. Ottoni, J.A. Blome, G.A. Reis, M. Vachharajani, and D.I. August. RIFLE: An Architectural Framework for User-Centric Information-Flow Security. pp. 243-254. IEEE, 2004.
Wei Xu, Sandeep Bhatkar, and R. Sekar. Taint-enhanced Policy Enforcement: A Practical Approach to Defeat a Wide Range of Attacks. In Proceedings of the 15th Conference on USENIX Security Symposium—vol. 15, USENIX-SS'06, Berkeley, CA, USA, 2006. USENIX Association, pp. 121-136.

* cited by examiner

SYSTEM AND METHOD FOR MAINTAINING SECURITY TAGS AND REFERENCE COUNTS FOR OBJECTS IN COMPUTER MEMORY

CROSS-REFERENCE TO RELATED APPLICATIONS

This is a non-provisional patent application of 62/247,460, filed on Oct. 28, 2015, the entirety of which is hereby incorporated by reference.

GOVERNMENT RIGHTS

This invention was made with government support under U.S. Government Contract Number FA8750-12-C0236, "Tunable Information Flow". The government has certain rights in the invention.

BACKGROUND OF INVENTION (1) Field of Invention

The present invention relates to a system and method for monitoring and enforcing information flow security in software systems and, more specifically, to a system for maintaining security tags and reference counts for objects in computer memory.

(2) Description of Related Art

Runtime monitoring is a computer system analysis technique that is based on extracting information from a running system and using such information to detect and react to observed behaviors that satisfy or violate specified properties, such as information flow security properties. Runtime monitor of information flow security is known to be extremely computationally intensive because it amounts to monitoring each program statement (or machine instruction) using several additional program statements (or machine instructions). Fundamentally, runtime monitoring is an exercise of mirroring every aspect of program execution, which implies at least a 100% runtime overhead and most likely several times more than that. Moreover, conventional runtime monitoring techniques mirror standard runtime environment operations such as automatic memory management and exceptional handling, which further multiplies the imposed overhead.

Some research prototypes have been developed that are directed to dynamic information flow tracking (DIFT), such as dynamic taint tracking systems. As previously noted, such systems (e.g., see the List of Incorporated Literature References, Literature Reference Nos. 4 and 6) have typically been research prototypes. These state-of-the-art systems suffer for the high runtime overhead due to having to mirror all program operations all the time.

Prior art in information flow tracking has not considered how to aggregate dynamic checks in any form. This is a challenge because typical runtime monitoring of information flow must mirror all operations in lockstep to maintain soundness. Other competing approaches (see Literature Reference Nos. 5 and 6) have generally attempted to optimize runtime monitoring by eliminating certain forms of tracking and minimizing the amount and complexity of code that needs to be tracked, but generally these processes still have large slowdowns because of extensive operation mirroring requirements.

In other work, Cohen et al (see Literature Reference No. 3) considered using information flow properties to secure transactional memory. However, they did not consider how to utilize hardware transactional memory to address and respond to information flow security violations.

Birgisson et al. (see Literature Reference No. 2) developed a technique for enforcing Authorization Policies in multithreaded environments using transactional memory introspection. This technique relies on software transaction memory and is limited to enforcing authorization.

Architecture based techniques were described in Literature Reference Nos. 7 and 10), which used either emulation or actual hardware to assist in tracking information flow security for running programs. This approach is often the most comprehensive, being able to monitor information flows throughout the software stack including operating systems and even bootloaders. However, because it intervenes at the lowest level, it can also be considered an approach that would be considerably invasive since it requires changes to the hardware or at least the running of all software on top of a non-standard emulator.

Dynamic binary instrumention or dynamic binary rewriting takes a program binary and rewrites it on-the-fly (see Literature Reference Nos. 6 and 9). This approach can monitor information flow in unmodified third-party software binaries but the runtime overhead is typically very high.

Source code instrumentation was described in Literature No. 11. Their process applied a technique similar to dynamic binary instrumentation except at the source code level. This is essentially a kind of inlining of monitoring code. It is faster than dynamic binary instrumentation but does not apply to unmodified third-party software binaries. Moreover, it is unclear how this technique would apply to monitoring information across program boundaries.

Compile-time checking for type-safe languages was described in Literature No. 8, which concentrates on checking of all information flow security properties at compile-time through checking of language constructs tailored for encoding information flow properties. This approach requires modification of the programming language itself and also rewriting of programs to take advantage of the new information flow-aware program language. Thus, this technique is quite invasive.

Thus, a continuing need exists for a system for monitoring and enforcing information flow security in software systems, and particularly one with a reduced runtime overhead in comparison to the prior art that is operable for maintaining security tags and reference counts for objects in computer memory.

SUMMARY OF INVENTION

Described is a system and method for monitoring and enforcing information flow security in software systems by maintaining security tags and reference counts for objects in computer memory. When an object or a portion of an object in the computer memory is being modified, the system arbitrarily performs operations of updating a security tag for a first segment comprising at least part of a first object being modified in a computer memory; updating reference counts for a first set of objects that the first object pointed to immediately prior to modification; and updating reference counts for a second set of objects that the first object points to immediately after the modification.

In another aspect, the system performs operations of examining one or more of the security tag for the first segment, the security tags for the first set of objects, the security tags for the second set of objects, and program counter security context. If the examination reveals a potential information flow security violation, the system performs a corrective action.

In another aspect, described is a system and method for maintaining security tags and reference counts for objects in computer memory during program execution. When an object or a portion of an object in the computer memory is being modified, the system preserves information to be able to perform additional operations at a later time during program execution. At a later time during program execution, the system arbitrarily performs additional operations of: updating a security tag for a first segment comprising at least part of a first object being modified in a computer memory; updating reference counts for a first set of objects that the first object pointed to immediately prior to modification; and updating reference counts for a second set of objects that the first object points to immediately after the modification.

Finally, the present invention also includes a computer program product and a computer implemented method. The computer program product includes computer-readable instructions stored on a non-transitory computer-readable medium that are executable by a computer having at least one processor, such that upon execution of the instructions, the at least one processor performs the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a system and method for monitoring and enforcing information flow security in software systems and, more specifically, to a system for maintaining security tags and reference counts for objects in computer memory. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. David F. Bacon, Perry Cheng, and V. T. Rajan. A Unified Theory of Garbage Collection. In Proceedings of the 19th Annual ACM SIGPLAN Conference on Object-oriented Programming, Systems, Languages, and Applications, OOPSLA '04, pages 50-68, New York, N.Y., USA, 2004.
2. Arnar Birgisson, Vinod Ganapathy, and et al. Enforcing Authorization Policies using Transactional Memory Introspection. 2008.
3. Ariel Cohen, Ron van der Meyden, and Lenore D. Zuck. Access Control and Information Flow in Transactional Memory. In David Hutchison, Takeo Kanade, Josef Kittler, Jon M. Kleinberg, Friedemann Mattern, John C. Mitchell, Moni Naor, Oscar Nierstrasz, C. Pandu Rangan, Bernhard Steffen, Madhu Sudan, Demetri Terzopoulos, Doug Tygar, Moshe Y. Vardi, Gerhard Weikum, Pierpaolo Degano, Joshua Guttman, and Fabio Martinelli, editors, Formal Aspects in Security and Trust, volume 5491, pages 316-330. Springer Berlin Heidelberg, Berlin, Heidelberg, 2009.
4. Winnie Cheng, Qin Zhao, Bei Yu, and Scott Hiroshige. TaintTrace: Efficient Flow Tracing with Dynamic Binary Rewriting. In Proceedings of the 11th IEEE Symposium on Computers and Communications, ISCC '06, pages 749-754, Washington, D.C., USA, 2006. IEEE Computer Society.

5. Andrey Ermolinskiy. Design and Implementation of a Hypervisor-based Platform for Dynamic Information Flow Tracking in a Distributed Environment. PhD thesis, University of California at Berkeley, Berkeley, Calif., USA, 2011. AAI3473888.

6. Vasileios P. Kemerlis, Georgios Portokalidis, Kangkook Jee, and Angelos D. Keromytis. Libdft: Practical Dynamic Data Flow Tracking for Commodity Systems. In Proceedings of the 8th ACM SIGPLAN/SIGOPS Conference on Virtual Execution Environments, VEE '12, pages 121-132, New York, N.Y., USA, 2012.

7. Shashidhar Mysore, Bita Mazloom, Banit Agrawal, and Timothy Sherwood. Understanding and Visualizing Full Systems with Data Flow Tomography. In Proceedings of the 13th International Conference on Architectural Support for Programming Languages and Operating Systems, ASPLOS XIII, pages 211-221, New York, N.Y., USA, 2008. ACM.

8. Andrew C. Myers. JFlow: Practical Mostly-static Information Flow Control. In Proceedings of the 26th ACM SIGPLAN-SIGACT Symposium on Principles of Programming Languages, POPL '99, pages 228-241, New York, N.Y., USA, 1999. ACM.

9. Feng Qin, Cheng Wang, Zhenmin Li, Ho-seop Kim, Yuanyuan Zhou, and Youfeng Wu. LIFT: A Low-Overhead Practical Information Flow Tracking System for Detecting Security Attacks. In Proceedings of the 39th Annual IEEE/ACM International Symposium on Microarchitecture, MICRO 39, pages 135-148, Washington, D.C., USA, 2006. IEEE Computer Society.

10. N. Vachharajani, M. J. Bridges, J. Chang, R. Rangan, G. Ottoni, J. A. Blome, G. A. Reis, M. Vachharajani, and D. I. August. RIFLE: An Architectural Framework for User-Centric Information-Flow Security. pages 243-254. IEEE, 2004.

11. Wei Xu, Sandeep Bhatkar, and R. Sekar. Taint-enhanced Policy Enforcement: A Practical Approach to Defeat a Wide Range of Attacks. In Proceedings of the 15th Conference on USENIX Security Symposium—Volume 15, USENIX-SS'06, Berkeley, Calif., USA, 2006. USENIX Association.

(2) Principal Aspects

Various embodiments of the invention include three "principal" aspects. The first is a system and method for monitoring and enforcing information flow security in software systems. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
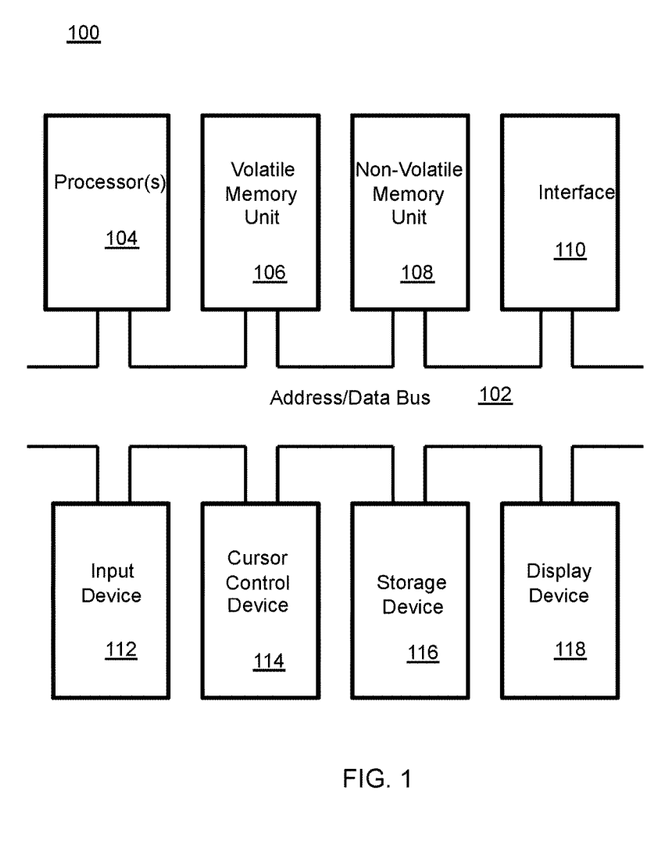
FIG. 1 is a block diagram depicting the components of a system according to some embodiments of the present disclosure.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
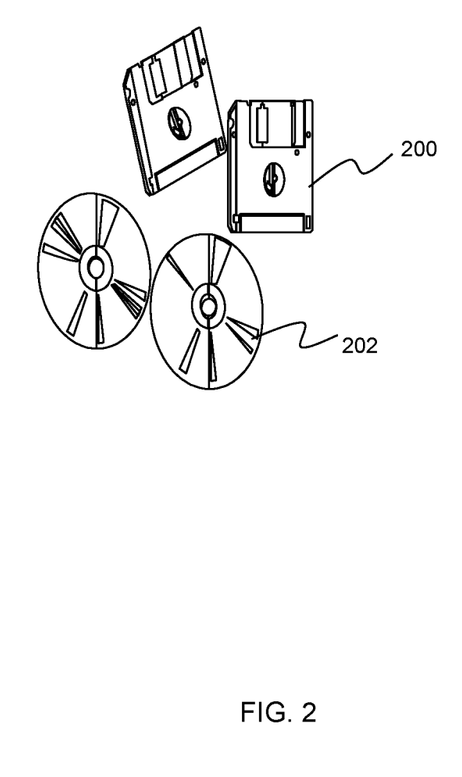
FIG. 2 is an illustration of a computer program product embodying an aspect of the present disclosure

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

This disclosure is directed to a runtime monitoring technique for monitoring and enforcing information flow security in software systems that uses modified variants of standard reference counting and deferred reference counting automatic memory management systems, both of which have never been used before in the context of security monitoring. This approach gives rise to the unique concept of aggregating information flow security checks by deferring them while continuing the bookkeeping needed to ensure that all the necessary checks do eventually occur. By interspersing monitoring (with standard reference counting) and deferring monitoring (with deferred reference counting), this new approach utilizes the facilities of automatic memory management (of computer memory) to dramatically reduce the computational and memory overhead of information flow security monitoring.

Runtime monitor of information flow security is known to be extremely computationally intensive because it amounts to monitoring each program statement (or machine instruction) using several additional program statements (or machine instructions). The technique of runtime monitoring with respect to the present disclosure, which uses a runtime environment's own automatic memory management facility of reference counting, takes advantage of the fact that a runtime environment's memory management will be updating the same program objects (both stack and heap) as would information flow control. Hence, by altering the runtime environment memory management to update information flow tracking along with the usual memory management bookkeeping, the system of the present disclosure benefits from spatial and temporal locality of access and potential fusion of instructions.

The technique of the present disclosure further improves upon the state-of-the-art by leveraging a particular form of automatic memory management called deferred reference counting, which defers memory management updates until they can be performed in bulk. Building in information flow tracking, the system of the present disclosure can take advantage of the same mechanism to reduce frequency of information flow tracking updates and to consolidate multiples of such updates.

Basically, an existing challenge is that when an object in computer memory is being mutated (that is, a new value is being written into a memory location where another value may have been previously written to), it is desirable to update the security tag of that object (including performing the information flow security check), and the reference count for that object. A unique aspect of the invention is that both updates are performed by a more efficient combined mechanism, rather than less efficiently by two separate mechanisms. Thus, the system as described herein can be utilized for runtime monitoring of information flow to improve security and security analytics in high assurance environments and components.

(4) Specific Details of Various Embodiments

The present disclosure provides a runtime software security monitor (also known as a language runtime tracker). It is specifically designed to monitor the data and control flows within the confines of a single software program executing on a single processor computer. Runtime tracking and propagating of security tags for Information flow tracking (IFT) is often a high overhead activity in terms of execution time (updating tags for individual statements or instructions). With respect to the present system, a Runtime Environment Information Flow Tracker, a unique method has been devised for tracking and propagating security tags by instrumenting a standard reference counting (RC) garbage collector (GC) and a deferred reference counting (DRC) garbage collector. A reference counting garbage collector, a standard programming language runtime system technique for automatically managing memory allocations and deallocations, is comprised of a mutator/modified modifier and a collector.

The method described above is based on the observation that the relationship between static information flow analysis and runtime information flow monitoring is similar to that of tracing garbage collection and reference counting garbage collection. Moreover, just as optimizations of tracing or reference counting garbage collection bring one closer to the other, optimizing static information flow analysis and runtime monitoring also leads one to bear increasing resemblance to the other. Simply put, static information flow analysis traces through all objects in a program once and for all to determine information flow. In contrast, runtime monitoring incrementally tracks information flow by updating the tag of each object for each statement or instruction. The similar analogy between tracing and reference counting garbage collection was observed by Bacon et al. (see Literature Reference No. 1). In that analogy, tracing GC do infrequent large collections by tracing the roots to live objects on the heap, whereas RC performs frequent small collections by "tracing" from the anti-roots of dead objects. To keep track of the number of references to objects allocated in heap memory, the modifier must update the reference count a heap object upon each access (i.e., creation or deletion of a reference). A deletion of the last reference to an object A will cause it to be scheduled for collection, but this leads to decrementing the reference counts of all the objects that A references, which may in turn lead to more collections and decrements.

Combining RC GC and IFT has several advantages. This approach takes advantage of temporal and spatial locality of updating the reference count and information flow tags. This is because a reference count and tag for the same memory object will be updated in close proximity in terms of time and the in-memory representation of the reference count and information flow tag can be located in close proximity to each other spatially to take advantage of computer architecture-supported prefetching and caching behaviors implemented in the microprocessor. Further, by coupling RC GC and IFT, the IFT can enforce a strong form of tracking such that when an object is garbage collected, its contents can also be zeroed out to avoid unintentional leakage through the garbage collector. The architecture and components of the system are described in further detail below.

(4.1) Architecture

Figure 3:
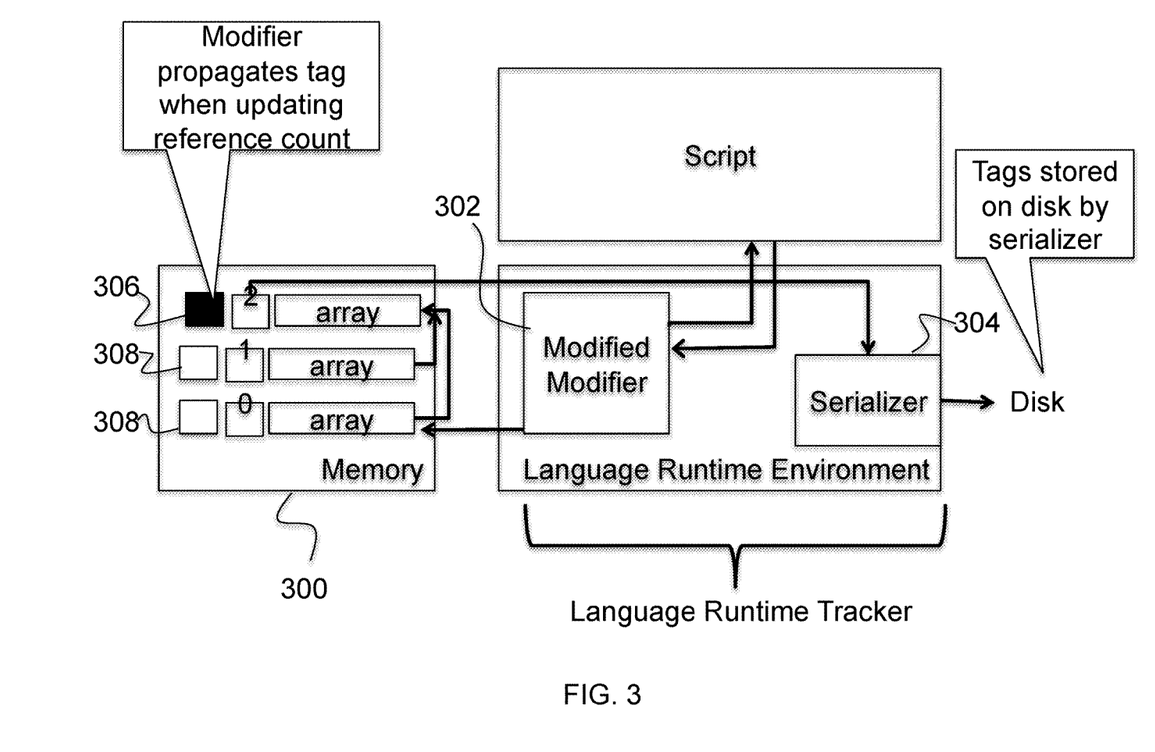
FIG. 3 is a top-level schematic of a Language Runtime Information Flow Tracker according to some embodiments of the present disclosure.

As shown in FIG. 3, the system is composed of three principal components, a modified allocator 300, a modified modifier 302 and a serializer 304. There is a fourth optional component, a modified collector. The black rectangle 306 denotes a set security tag bit, while the white rectangles 308 denote a clear bit. The modified reference counting runtime extends the standard reference counting allocator 300, modifier 302, serializer 304, and collector to work with security tags. The modified modifier ("modifier") 302 will directly manipulate heap memory of a running program. As with standard RC, all heap memory object carry along an associated reference count field, which is usually a machine word in length. The architecture of the present system further adds a security tag (a 1-bit tag indicating whether the memory is high or low integrity) preceding the corresponding reference count field.

(4.1.1) Allocator

When memory blocks start out in the standard memory free list, the security tag can be initialized as high integrity ("1") if the associated memory is zeroed out or low integrity ("0") if it is not. Upon allocation when the standard RC algorithm initializes the reference count to 1, the security tag is updated to that of the program context of the allocator 300 (i.e., the least upper bound of the security tags of any conditional branches taken to reach this allocation point).

(4.1.2) Mutator or Modifier

A modifier takes three parameters: a destination memory location (an address) d, an offset index i into the destination, and a source memory location s. In a standard RC modifier, the reference count of the object at s is incremented. In the modified modifier 302 according to the principles of the present invention, besides incrementing the reference count, the modifier 302 must also update the tag of d to that of s.

(4.1.3) Serializer

The serializer 304 writes reference counted objects as a sequence of bytes on to durable mass storage (e.g., magnetic hard disk (HD), solid state disks (SSD), or nonvolatile RAM (NVRAM)). To support IFT across program runs or any suspension of program execution, the serializer 304 must write the security tag along with the rest of the reference counted object representation. Although reference count itself is not serialized, the security tag for each object must be serialized with the object. This enables the tag to be recovered when the object is deserialized. This mechanism is relevant for programs that utilize object serialization and deserialization to persist objects across runs of a program.

Figure 4:
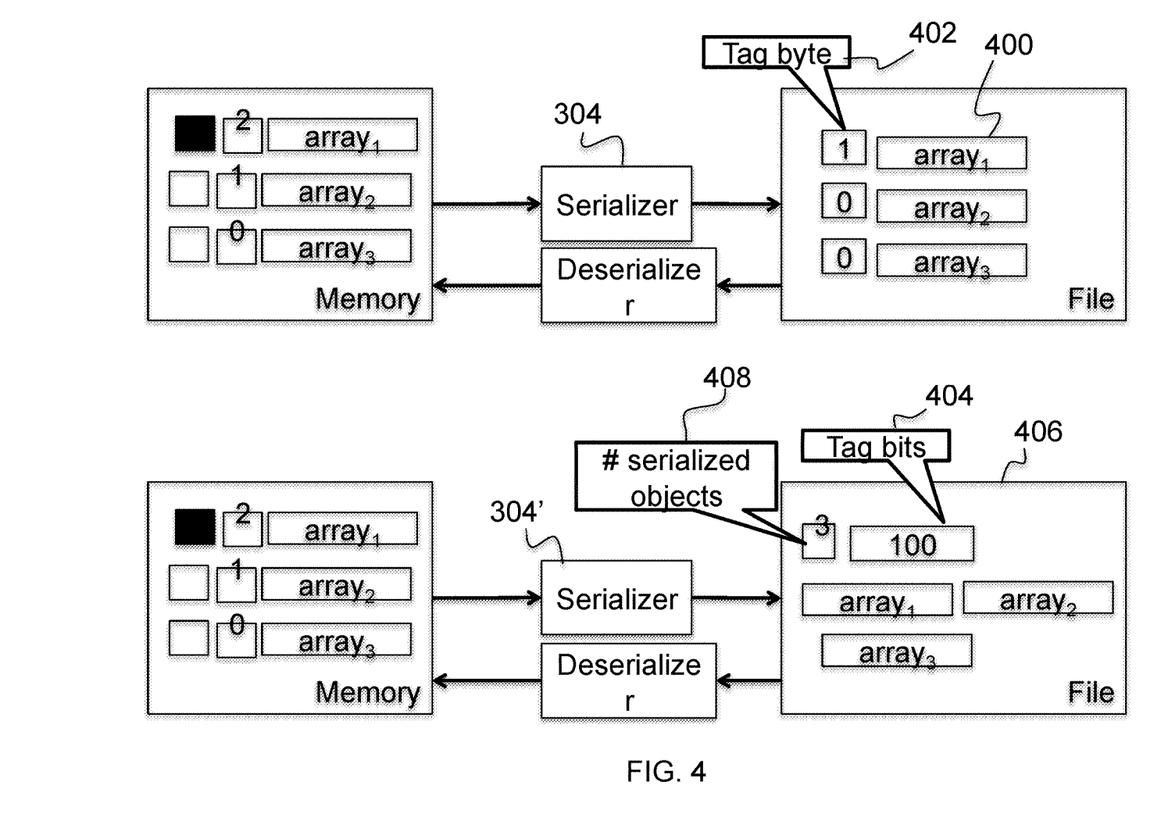
FIG. 4 is an illustration of a serializer as used in the system according to some embodiments of the present disclosure.

As shown in FIG. 4, there are two main formats for serialization of security tags. FIG. 4 is an illustration of a serializer 304 as used in the system, which will prefix all serialized data 400 with a security tag byte prefix 402. An alternate design of the serializer 304' would aggregate all security tag bits 404 at the beginning of the file 406 to save on space after a word indicating the number of serialized objects 408. The amount of lost storage is merely the number of bits for byte or word alignment.

In the example in FIG. 4, the array1 is high integrity 1 but array2 and array3 are 0, low integrity. The naive form of prefixing each serialized object with a security tag byte 402 wastes 7-bits per object and imposes a 1-byte overhead per memory object which would entail 25% overhead assuming an average object is only a single 32-bit machine word. The naive approach may also negate any alignment assumptions relied upon by programs since now all objects may be offset by a byte.

A slightly better form forms a header in the serialized file to store the tag bits 404 of all the serialized objects 408 together. This reduces the maximum padding and overhead to 1-bit per object. For a file with 100 serialized objects (each a 32-bit machine word), this implies a 3% overhead (1-bit per 32-bit word) and 4-bits wasted (in order to align the bits to a byte alignment).

(4.1.4) Collector

The collector (shown in FIG. 5 as element 500) is responsible for traversing the object graph (i.e., dependents) of objects with a reference count of 0. It decrements the reference counts for any dependent objects and deallocates any object with reference count of 0. In deallocating the objects, it will interact with memory management to add the deallocated space to the free list. The collector 500 can apply a depth-first traversal to object graph. This approach does not by itself handle cycles as is the case with all standard reference counting techniques. Instead, the reference counting must be supplemented by a standard tracing garbage to collect cycles. In terms of tracking information flows, the collector 500 does not play a direct role except when modified to account for deferred reference counting as described in Section 4.3 to update (downgrade or upgrade) information flow security tags in bulk.

(4.2) Semantics

The information flow tracking design adds primitives for comparing ( ) and updating (:=) security tags to the modifier 302. Security tags are defined to be a partially ordered set of symbols. is a relation on security tags. The updating operator := updates a reference cell containing a security tag with a new security tag. The ordering is further constrained such that there must exist a least upper bound (join) and greatest lower bound (meet) for each pair of elements in the set. Thus, security tags are defined as a bounded lattice L=SL , , , such that SL is some finite set of symbols (e.g., SL={TopSecret, Secret, Unclassified}). For a summary of these primitives, refer to FIG. 5.

Figure 5:
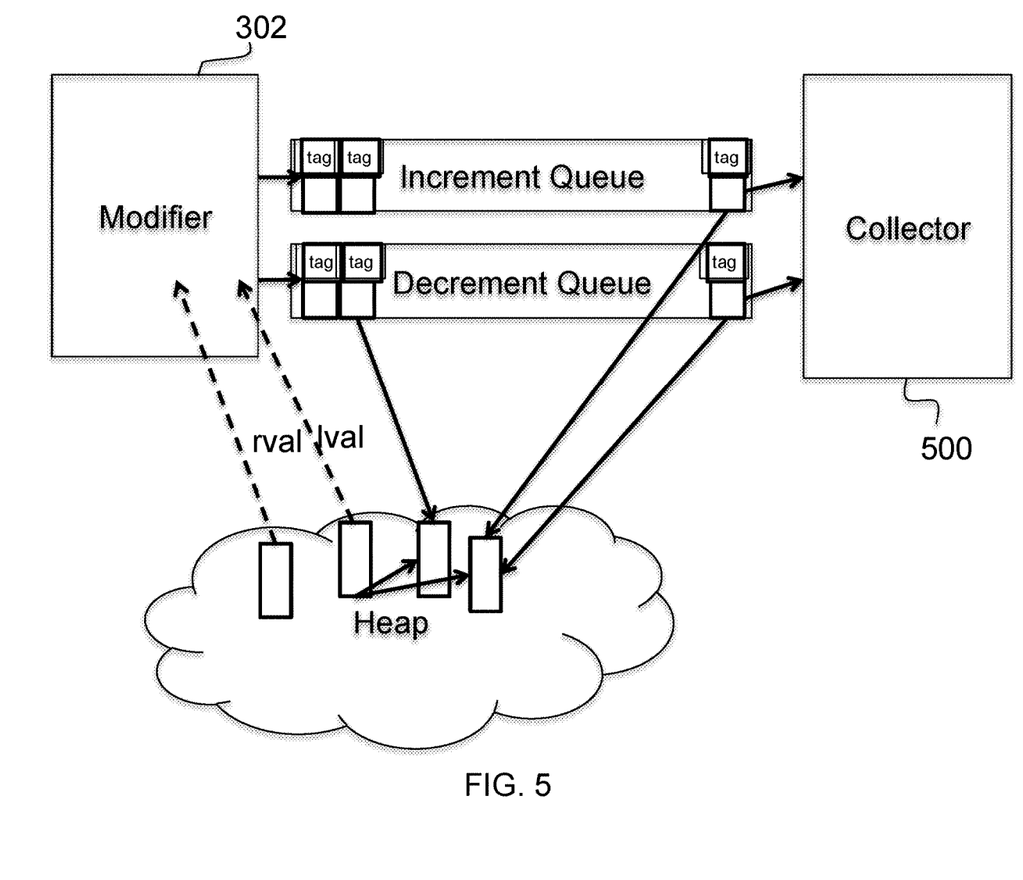
FIG. 5 is an illustration of a modified modifier as used in the system according to some embodiments of the present disclosure.

FIG. 5 is an illustration of a modifier 302 as used in the system of the present disclosure, which checks information flow upon each update by comparing tag(rval) with tag (lval$_i$). The modifier 302 then performs the standard reference counting updates: The overwritten lval$_i$ will be enqueued on the decrement queue whereas the new rval will be enqueued on the increment queue.

Each memory object A may have references (i.e., pointers) to multiple other memory objects B, C, D, . . . B, C, and D are called dependencies of A. The main information property in this abstraction of standard programming languages is that the ith dependency of A, Ai must have a consistent security tag. In particular, one cannot update Ai to a pointer whose target has a tag. Examples of signature primitives include:

:SL×SL→bool

:SL×SL→SL x y=z iff x z, y z, and w.x w and y w, z w

:SL×SL→SL x y=z iff z x, z y, and w.w x and w y, w z :=:location×SL→void tag(x) projects out the security tag of an object denoted by x For the simple 1-bit security tag scheme described above, the specific instantiations of the primitives are natural. is the standard bit comparison (i.e., 0 1 and is reflexive). It follows that 0 1=1 and 0 1=0. However, for more complicated security tag schemes, the primitives may be enriched.

The key operation for IFT over RC is the update operation. In particular, the reference counting implementation in the runtime will have an update operation with the following type signature update:location×int×location→void where the first parameter is the memory location to an object A being updated, the second the index into an array with pointers to all the objects A depends on (i.e., references), and the third the memory location to the new object A should point to. This is also where the runtime system should flag a warning or take corrective action to address a potential information flow security violation. Depending on the context, appropriate corrective actions in response to violation may include:

1. Termination of the program (i.e., this effectively turns all information flow violations into availability denial of service),
2. Filtering of the suspect value (possibly by truncation or zeroing out),
3. Rolling back the suspect update (e.g., using a database transaction-like logging approach or a hardware transactional memory system such as Intel(R) Transactional Synchronization Extensions (TSX) Restricted Transactional Memory (RTM)).

For example, for update(lval, i, rval), if tag(rval) tag(lval)^tag(rval) tag(lvali) does not hold, then there is a violation of information flow security. For the hardware transactional memory extension, the runtime environment can speculatively execute updates wrapped in XBEGIN and XEND to indicate the transaction scope (i.e., the critical section) and roll-back that update atomically with XABORT in the case the update fails to satisfy the above inequalities. To summarize, to handle the transactional response to information flow policy violation, the following algorithm is implemented:

1. For each update operation, wrap the instructions implementing the operation with)(BEGIN and XEND to indicate a speculative transaction
2. Check the inequalities tag(rval) tag(lval)^tag(rval) tag (lvali)
3. If the inequalities fail to hold, issue an XABORT.
4. If the inequalities hold, proceed with committing the transaction.

The modified modifier works as follows:

1. First fetch lvali from memory.
2. Compare lval, rval, lvali tags as described above.
3. If the condition holds, update the tag(lval).
4. Otherwise, signal a warning or take another response to violation.
5. Update lvali and rval's reference counts as usual.

(4.3) Modified Deferred Reference Counting Runtime

DRC changes the semantics of IFT (for example, see FIG. 5). Instead of IFT immediately responding to an information flow security violation, it waits until a configurable number of mutations (i.e., the deferred reference count operation queue size). For a queue size of n, this means that the IFT is no more than n−1 information flow security violations behind. Moreover, for batch programs, the collector 500 can be called upon termination to guarantee that all violations will be responded to. For interactive programs (e.g., programs with event loops that run indefinitely), a period call to the collector 500 can guarantee that all violations are detected eventually and such detection is behind by no more than n−1 mutations or t time where t is the maximum duration between collections.

The modified modifier 302 works as follows:

1. First fetch lvali from memory.
2. Enqueue an increment operation for rval along with tag(rval) and tag(lval)
3. Enqueue a decrement operation for the original lvali along with tag(lvali) and tag(rval)

The enqueue operations (for both increments and decrements) of the modifier 302 will check the respective queue size. If the queue is full, it will issue a collect operation and only after the collect operation is completed will it enqueue the pointer to the object that will be incremented or decremented.

The modified collector 302 performs the following operations for reference counting collectors 500:

1. Increment the counts for the objects on the stack to put all objects in the stack in the increment queue.
2. For each object on the decrement queue, traverse its dependencies object graph and for each object in the graph:
   i. Decrement the reference count.
   ii. Compare the cache tags tag(object) and tag(rval): tag(rval) tag(object).
      a) If the condition holds, update the tag(lval).
      b) Otherwise, signal a warning or take another response to violation.
3. For each object on the increment queue, traverse its dependencies object graph and for each object in the graph:
   i. Increment the reference count.
   ii. Compare the cache tags tag(object) and tag(lval): tag(object) tag(lval).

a) If the condition holds, update the tag(lval).
b) Otherwise, signal a warning or take another response to violation.
4. Finally, enqueue decrement operations for all objects on the stack The above technique is similar to standard DRC collection except that information flow security tag checking and handling is interspersed with the bulk processing of the reference count decrement and increment queues. Note, it is important for both security tags in the comparison to be cached in the increment and decrement queues because they may change before the runtime environment gets to processing the corresponding element in the queues.

The serializer in the DRC collector 500 must first flush any pending increment or decrement operations and by extension updates to security tags before constructing the serialized representation of the reference counted object to be written to mass storage. This is critical, because without such an operation, when the program is resumed or restarted, those pending reference counting operations will have been lost and therefore the reference counting state would be inconsistent.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A method for maintaining security tags and reference counts for objects in computer memory, the method comprising an act of:
   causing at least one processor to execute instructions encoded on a non-transitory computer-readable medium, such that upon execution, the at least one processor performs operations of:
      updating a security tag for a first segment comprising at least part of a first object being modified in a computer memory;
      updating reference counts for a first set of objects that the first object pointed to immediately prior to modification; and
      updating reference counts for a second set of objects that the first object points to immediately after the modification;
      examining one or more of the security tags for the first segment, the security tags for the first set of objects, the security tags for the second set of objects, and program counter security context; and
      if the examination reveals a potential information flow security violation, performing a corrective action, the corrective action being at least one of terminating a program, filtering out a suspect value, or rolling back a suspect update.

2. The method as set forth in claim 1, further comprising operations of:
   when the first object or a part of the first object in the computer memory is being modified, preserving information to be able to perform additional operations at a later time during program execution;
   at a later time during program execution, performing additional operations of:
      updating the security tag for the first segment comprising at least part of the first object being modified in the computer memory;
      updating reference counts for the first set of objects that the first object pointed to immediately prior to modification; and
      updating reference counts for the second set of objects that the first object points to immediately after the modification.

3. The method as set forth in claim 1, further comprising operations of:
   when the first object or a part of the first object in the computer memory is being modified, preserving information to be able to perform additional operations at a later time during program execution;
   at a later time during program execution, performing additional operations of:
      updating the security tag for the first segment comprising at least part of the first object being modified in the computer memory;
      updating reference counts for the first set of objects that the first object pointed to immediately prior to modification; and
      updating reference counts for the second set of objects that the first object points to immediately after the modification.

4. A system for maintaining security tags and reference counts for objects in computer memory, the system comprising:
   at least one processor and a computer memory, the computer memory having instructions encoded thereon, such that when an object or a portion of an object in the computer memory is being modified, the system arbitrarily performs operations of:
      updating a security tag for a first segment comprising at least part of a first object being modified in a computer memory;
      updating reference counts for a first set of objects that the first object pointed to immediately prior to modification; and
      updating reference counts for a second set of objects that the first object points to immediately after the modification;
      examining one or more of the security tags for the first segment, the security tags for the first set of objects, the security tags for the second set of objects, and program counter security context; and
      if the examination reveals a potential information flow security violation, performing a corrective action, the corrective action being at least one of terminating a program, filtering out a suspect value, or rolling back a suspect update.

5. The system as set forth in claim 4, further comprising operations of:
   when the first object or a part of the first object in the computer memory is being modified, preserving information to be able to perform additional operations at a later time during program execution;
   at a later time during program execution, performing additional operations of:

updating the security tag for the first segment comprising at least part of the first object being modified in the computer memory;
updating reference counts for the first set of objects that the first object pointed to immediately prior to modification; and
updating reference counts for the second set of objects that the first object points to immediately after the modification.

6. The system as set forth in claim 4, further comprising operations of:
when the first object or a part of the first object in the computer memory is being modified, preserving information to be able to perform additional operations at a later time during program execution;
at a later time during program execution, performing additional operations of:
updating the security tag for the first segment comprising at least part of the first object being modified in the computer memory;
updating reference counts for the first set of objects that the first object pointed to immediately prior to modification; and
updating reference counts for the second set of objects that the first object points to immediately after the modification.

7. A computer program product for maintaining security tags and reference counts for objects in computer memory, the computer program product comprising:
a non-transitory computer-readable medium having executable instructions encoded thereon, such that upon execution of the instructions by at least one processor, the at least one processor performs operations of:
updating a security tag for a first segment comprising at least part of a first object being modified in a computer memory;
updating reference counts for a first set of objects that the first object pointed to immediately prior to modification; and
updating reference counts for a second set of objects that the first object points to immediately after the modification;
examining one or more of the security tags for the first segment, the security tags for the first set of objects, the security tags for the second set of objects, and program counter security context; and
if the examination reveals a potential information flow security violation, performing a corrective action, the corrective action being at least one of terminating a program, filtering out a suspect value, or rolling back a suspect update.

8. The computer program product as set forth in claim 7, further comprising instructions for causing at the least one processor to perform operations of:
when the first object or a part of the first object in the computer memory is being modified, preserving information to be able to perform additional operations at a later time during program execution;
at a later time during program execution, performing additional operations of:
updating the security tag for the first segment comprising at least part of the first object being modified in the computer memory;
updating reference counts for the first set of objects that the first object pointed to immediately prior to modification; and
updating reference counts for the second set of objects that the first object points to immediately after the modification.

9. The computer program product as set forth in claim 7, further comprising instructions for causing the at least one processor to perform operations of:
when the first object or a part of the first object in the computer memory is being modified, preserving information to be able to perform additional operations at a later time during program execution;
at a later time during program execution, performing additional operations of:
updating the security tag for the first segment comprising at least part of the first object being modified in the computer memory;
updating reference counts for the first set of objects that the first object pointed to immediately prior to modification; and
updating reference counts for the second set of objects that the first object points to immediately after the modification.

\* \* \* \* \*